Sept. 24, 1935.  S. GUIDA  2,015,521
PIPE
Filed April 6, 1935
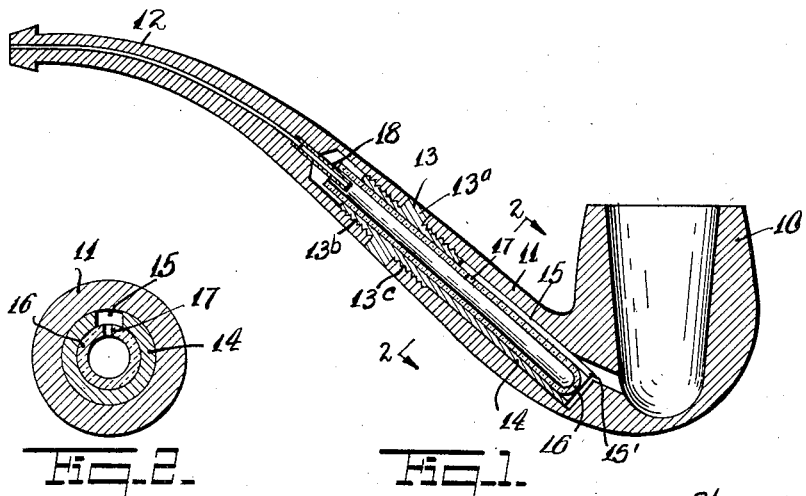
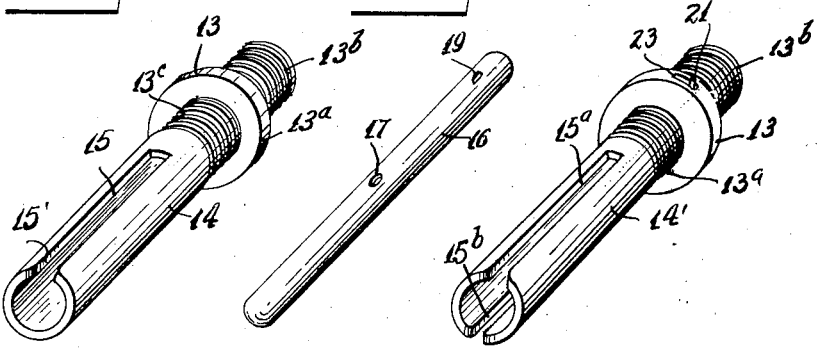
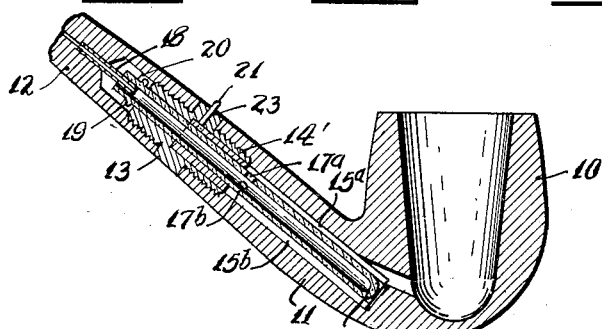
INVENTOR
SILVIO GUIDA
BY
ATTORNEY Patented Sept. 24, 1935

2,015,521

UNITED STATES PATENT OFFICE 2,015,521

PIPE

Silvio Guida, Hudson Heights, N. J.

Application April 6, 1935, Serial No. 15,072

6 Claims. (Cl. 131—12)

This invention relates to new and useful improvements in a cool moistless pipe.

The invention has for an object the construction of a pipe as mentioned which is characterized by an aluminum coupling element arranged between a pipe mouth piece and a pipe stem, and said coupling element being associated with an aluminum tubular element supporting a hygiene glass tube having a closed end in a particular manner so that saliva entering the pipe may be collected and prevented from reaching the bowl and the heat of the smoke reduced by the aluminum and glass members.

Still further it is proposed to so arrange the parts that moisture drawn up from the tobacco will discharge into the glass tube with the closed end instead of being drawn into the smoker's mouth and the glass tube washed or emptied at will.

A still further object of the invention is to construct the aluminum tubular member so that it is formed with a longitudinal slot, and to form the glass tube with the closed end with an opening alignable with the slot in a manner so as to produce the objects mentioned.

Furthermore, the invention contemplates an arrangement whereby the slotted tubular element may be adjusted so that the slots thereof coact with different openings formed in the tube with the closed end.

Another object of the invention is the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a longitudinal sectional view of a pipe constructed according to this invention.

Fig. 2 is a transverse sectional view taken on the line 2—2 of Fig. 1.

Fig. 3 is a perspective view of the coupling element and tubular member, illustrated per se.

Fig. 4 is a perspective view of the tube with the closed end illustrated per se.

Fig. 5 is a fragmentary longitudinal sectional view of a pipe constructed according to another embodiment of the invention.

Fig. 6 is a perspective view of the coupling element and tubular element used in the device shown in Fig. 5.

The pipe, according to this invention, comprises a pipe bowl 10 having a pipe stem 11 associated with a mouthpiece 12. A coupling element 13 is arranged between the pipe stem and mouthpiece for joining these parts separably together. This coupling element 13 is made of aluminum and supports a tubular element 14 of aluminum extending to the base of the stem and formed with a longitudinal slot 15 having its bottom end 15' communicating with the bowl 10. A glass tube 16 is non-rotatively and tightly mounted through the coupling element 13 and into said tubular element 14 and has a closed bottom end adjacent the bowl and is formed with an opening 17 intermediate of its ends and communicating with the top of the longitudinal slot 15. This construction reduces the heat of the inhaled smoke, since the aluminum coupling 13 is surrounded by atmospheric temperature and both the aluminum coupling 13 and the aluminum tube 14 are good conductors of heat.

More particularly, the pipe bowl 10, the stem 11, and the mouthpiece 12 are of standard construction and design. The device differs from prior devices in the arrangement of the coupling 13, the tubular element 14 and the glass tube 16. More specifically, the coupling 13 comprises a central enlarged portion 13a by which it may be operated, and threaded ends 13b and 13c.

The threaded end 13b threadedly engages into the adjacent end of the mouthpiece 12. The threaded end 13c threadedly engages into the stem 11. A small tube 18 engages partially within the passage of the mouthpiece 12 and partially extends into the open end of the tube 16. This tube 18 should be preferably of white metal but it may be of any other suitable material.

The tubular element 14 is integral with the threaded end 13c of the coupling and extends into the base of the stem 11. The longitudinal slot 15 extends from the base end of the tubular element to immediately adjacent the threaded portion 13c. The tube 16 is held against rotation relative to the coupling 13 by reason of small projections 19 from the sides thereof engaging into receiving recesses 20 upon the free end of the threaded portion 13. This interengagement of parts is such as to hold the tube 16 in a position in whch the opening 17 aligns with the longitudinal slot 15.

In Figs. 5 and 6 a modified form of the invention has been disclosed which is very similar to the previous form, similar parts being indicated by identical reference numerals, but distinguishing in the fact that the tubular element is rotatively adjustable relative to the coupling within a limited scope so that longitudinal slots therein may align with openings in the tube 16. More particularly, there is a tubular element 14' having its upper end rotatively engaging within the material of the coupling 13, and extending into the base of the stem and formed with diametrically opposite, or at other angular distances, longitudinal slots 15ᵃ and 15ᵇ.

A pin 21 projects from the tubular element 14' and operates in a transverse slot 23 formed in the material of the coupling 13. The arrangement is such that the end of the pin 21 projects so that the tubular element 14' may be turned as limited by the ends of the slot 23. The tubular element 14' maintains adjusted positions frictionally.

The tube 16 is formed with several openings 13ᵃ and 13ᵇ arranged so that one or the other opening aligns with one or the other of the longitudinal slots 15, 15ᵇ, depending upon the adjustment of the rotative position of the tubular element 14'.

The operation of the device may be understood from the following description:—When the pipe is being used and the smoker draws in, the smoke will pass through the longitudinal slot 15, through the opening 17, and through the mouthpiece of the pipe. The moisture will run downhill so to speak, and collect in the closed end of the tube 16. It will be quite difficult to draw the moisture up into the mouth of the smoker since air will be drawn in through the bowl instead. Saliva from the mouth of the smoker instead of reaching the tobacco in the bowl will also be collected in the tube 16. The tube may be cleaned after each smoke or whenever desired. It is readily removable merely by removing the mouthpiece 12 and then lifting the tube from its position.

In the form shown in Fig. 5 there is an arrangement whereby the passage of the air may be controlled. For example, should a small piece of tobacco clog the passage 15ᵃ, the smoker need only move the pin 21 so as to turn the tubular member 14' to connect the passage 15ᵇ with the opening 17ᵇ. Thus, the smoke may be completed without necessitating the separation and cleaning of the pipe.

The passages 15, or 15ᵃ and 15ᵇ may be readily cleaned by removing the coupling 13 from the end of the pipe stem.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl, and a glass tube non-rotatively mounted through said coupling element and into said tubular element and having a closed end adjacent said bowl and an opening communicating with the top end of said longitudinal slot.

2. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl, and a glass tube non-rotatively mounted through said coupling element and into said tubular element and having a closed end adjacent said bowl and an opening communicating with the top end of said longitudinal slot, said coupling element comprising an enlarged portion disposed between the ends of the stem and mouthpiece and associated with threaded portions adapted to threadedly engage into the stem and mouthpiece.

3. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl and a glass tube non-rotatively mounted through said coupling element and into said tubular element and having a closed end adjacent said bowl and an opening communicating with the top end of said longitudinal slot, said coupling element comprising an enlarged portion disposed between the ends of the stem and mouthpiece and associated with threaded portions adapted to threadedly engage into the stem and mouthpiece, said tubular element being integral with the threaded end connected with the stem.

4. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl and a glass tube non-rotatively mounted through said coupling element and into said tubular element and having a closed end adjacent said bowl and an opening communicating with the top end of said longitudinal slot, the non-rotative mounting of the tube comprising projections therefrom engaging into slots formed in the coupling element.

5. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl, and a glass tube non-rotatively mounted through said coupling element and into said tubular element and having a closed end adjacent said bowl and an opening communicating with the top end of said longitudinal slot, said tubular element being rotatively adjustably mounted on said coupling element, and said tube having an additional opening alignable with an additional longitudinal slot formed in the tubular element, in a rotative adjusted position of the tubular element.

6. A cool moistless pipe, comprising a pipe bowl and stem, a mouthpiece for the stem, an aluminum coupling element between the pipe and stem for joining these parts separably together and supporting an aluminum tubular element extending to the base of the stem and formed with a longitudinal slot having a bottom end communicating with the bowl, and a glass tube non-rotatively mounted through said coupling element and into said tubular element and having a closed end adjacent said bowl and an opening communicating with the top end of said longitudinal slot, said tubular element being rotatively adjustably mounted on said coupling element, and said tube having an additional opening alignable with an additional longitudinal slot formed in the tubular element, in a rotative adjusted position of the tubular element, the tubular element engaging into the coupling element and having a radial pin extending through a slot in the coupling element by which the tubular element may be adjusted.

SILVIO GUIDA.